US011390260B2

(12) United States Patent
Barade et al.

(10) Patent No.: US 11,390,260 B2
(45) Date of Patent: Jul. 19, 2022

(54) PARKING BRAKE APPARATUS AND METHOD FOR A VEHICLE POWER UNIT TO WHICH A VEHICLE TOWED UNIT CAN BE CONNECTED

(71) Applicant: Bendix Commercial Vehicle Systems LLC, Elyria, OH (US)

(72) Inventors: Girish Barade, Chandler, AZ (US); Christopher H Hutchins, Bay Village, OH (US); Thomas J Weed, North Ridgeville, OH (US); Andrew L Kennedy, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 118 days.

(21) Appl. No.: 16/993,446

(22) Filed: Aug. 14, 2020

(65) Prior Publication Data
US 2022/0048490 A1 Feb. 17, 2022

(51) Int. Cl.
*B60T 17/22* (2006.01)
*B60T 13/26* (2006.01)

(52) U.S. Cl.
CPC .......... *B60T 17/226* (2013.01); *B60T 13/263* (2013.01); *B60T 13/265* (2013.01); *B60T 13/268* (2013.01)

(58) Field of Classification Search
CPC .......... B60T 7/20; B60T 8/1887; B60T 13/26; B60T 13/261; B60T 13/263; B60T 13/265; B60T 13/38; B60T 13/385; B60T 17/22; B60T 17/226
See application file for complete search history.

(56) References Cited

U.S. PATENT DOCUMENTS

| 4,261,624 | A |   | 4/1981  | Plantan  |            |
|-----------|---|---|---------|----------|------------|
| 5,042,883 | A | * | 8/1991  | McCann   | B60T 17/18 |
|           |   |   |         |          | 303/29     |
| 5,986,544 | A | * | 11/1999 | Kaisers  | B60T 13/683|
|           |   |   |         |          | 280/504    |
| 6,652,038 | B1|   | 11/2003 | Frye     |            |

(Continued)

FOREIGN PATENT DOCUMENTS

CA    2030201 A1    5/1991
DE    4129203 A1    3/1993
(Continued)

*Primary Examiner* — Thomas J Williams
(74) *Attorney, Agent, or Firm* — Cheryl Greenly; Brian Kondas; Eugene Clair

(57) ABSTRACT

A parking brake apparatus is provided for a power unit having air brake parking components and to which a towed unit having air brake parking components can be connected. The parking brake apparatus comprises a controller arranged to monitor a pressure signal indicative of a delivery air pressure applied to the air brake parking components of the towed unit when the towed unit is connected to the power unit. The controller is also arranged to provide a status signal indicative of whether or not a towed unit is connected to the power unit based upon the pressure signal. The controller further enables the status signal to be processed to control application or release of any combination of air brake parking components of the power unit and the towed unit to park or unpark the power unit as well as the towed unit, if connected to the power unit.

18 Claims, 4 Drawing Sheets

(56) References Cited

U.S. PATENT DOCUMENTS

| | | | |
|---|---|---|---|
| 8,098,145 B2* | 1/2012 | Ancuta | B60T 17/22 |
| | | | 340/687 |
| 9,623,849 B2 | 4/2017 | Spath | |
| 9,650,030 B2* | 5/2017 | Nagura | B60T 7/20 |
| 2011/0025482 A1 | 3/2011 | Algueera | |
| 2018/0086322 A1* | 3/2018 | Zula | B60T 7/085 |
| 2020/0079341 A1 | 3/2020 | Van Thiel | |
| 2020/0180585 A1* | 6/2020 | Barade | B60T 13/686 |
| 2022/0048490 A1* | 2/2022 | Barade | B60T 17/226 |

FOREIGN PATENT DOCUMENTS

| | | |
|---|---|---|
| DE | 4200302 C2 | 8/1995 |
| DE | 19955798 A1 | 5/2001 |
| JP | 08230560 A | 9/1996 |

\* cited by examiner

PARKING BRAKE APPARATUS AND METHOD FOR A VEHICLE POWER UNIT TO WHICH A VEHICLE TOWED UNIT CAN BE CONNECTED

BACKGROUND

The present application relates to vehicle parking systems, and is particularly directed to a parking brake apparatus and method for a vehicle power unit, such as a truck tractor, to which a vehicle towed unit, such as a truck trailer, can be connected.

Truck trailers are frequently connected and disconnected from truck tractors. The tractor is in bobtail mode when no trailer is connected to the tractor. The tractor is in a towing mode when a trailer is connected to the tractor. When it is desired to park the tractor and the tractor is in bobtail mode, the vehicle driver applies park brakes of the tractor. When it is desired to park the tractor and the tractor is in towing mode, the vehicle driver applies both park brakes of the tractor and park brakes of the trailer. In some known tractors, the vehicle driver is provided with a status signal that indicative of whether or not a trailer is connected to the tractor. The status signal informs the vehicle driver in knowing if park brakes of a trailer, if connected to the tractor, need to be applied when the vehicle is parked or released when the vehicle is unparked. Accordingly, those skilled in the art continue with research and development efforts in the field of tractor-trailer parking systems in which the vehicle driver is informed of status as to whether or not a trailer is connected to the tractor.

SUMMARY

In accordance with one embodiment, a parking brake apparatus is provided for a vehicle power unit having air brake parking components and to which a vehicle towed unit having air brake parking components can be connected. The parking brake apparatus comprises an electronic controller associated with the vehicle power unit and arranged to monitor a pressure signal indicative of a delivery air pressure applied to air brake parking components of a vehicle towed unit when a vehicle towed unit is connected to the vehicle power unit. The electronic controller is also arranged to provide a status signal indicative of whether or not a vehicle towed unit is connected to the vehicle power unit based upon the pressure signal. The electronic controller further enables the status signal to be processed to control application or release of any combination of air brake parking components of the vehicle power unit and air brake parking components of the vehicle towed unit to park or unpark the vehicle power unit and the vehicle towed unit if connected to the vehicle power unit.

In accordance with another embodiment, a parking brake apparatus is provided for a vehicle power unit having air brake parking components and to which a vehicle towed unit having air brake parking components can be connected. The parking brake apparatus comprises an electronic controller associated with the vehicle power unit and arranged to monitor a first pressure signal indicative of a delivery pressure applied to air brake components of the vehicle power unit. The electronic controller is also arranged to monitor a second pressure signal indicative of a delivery air pressure applied to air brake parking components of a vehicle towed unit when a vehicle towed unit is connected to the vehicle power unit. The electronic controller is further arranged to provide a status signal indicative of whether or not a vehicle towed unit is connected to the vehicle power unit based upon the first and second pressure signals. The electronic controller further enables the status signal to be processed to control application or release of any combination of air brake parking components of the vehicle power unit and air brake parking components of the vehicle towed unit to park or unpark the vehicle power unit and the vehicle towed unit if connected to the vehicle power unit.

In accordance with yet another embodiment, a parking brake apparatus comprises at least a portion of a vehicle power unit having air brake parking components including a parking brake controller. The parking brake apparatus also comprises at least a portion of a vehicle towed unit connectable to the vehicle power unit. The portion of the vehicle towed unit has air brake parking components including a towed unit pressure sensor arranged to provide a towed unit pressure signal indicative of a delivery air pressure applied to the air brake parking components of the vehicle towed unit. The parking brake controller of the vehicle power unit is arranged to monitor the towed unit pressure signal, provide a status signal indicative of whether or not the vehicle towed unit is connected to the vehicle power unit based upon the towed unit pressure signal, and enable the status signal to be processed to control application or release of any combination of air brake parking components of the vehicle power unit and air brake parking components of the vehicle towed unit to park or unpark the vehicle power unit and the vehicle towed unit if connected to the vehicle power unit.

In accordance with still another embodiment, a method is provided for a vehicle power unit having a compressed air reservoir and to which a vehicle towed unit can be connected. The method comprises determining as a first condition if air pressure is being delivered to air brake components of the vehicle towed unit. The method also comprises determining as a second condition if the air pressure being delivered to air components of the vehicle towed unit is above a predetermined threshold pressure for a predetermined amount of time. The method further comprises providing a status signal indicative of the vehicle towed unit being connected to the vehicle towed unit when the first and second conditions are met.

DETAILED DESCRIPTION

The present application is directed to a parking brake apparatus and method for a vehicle such as a truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
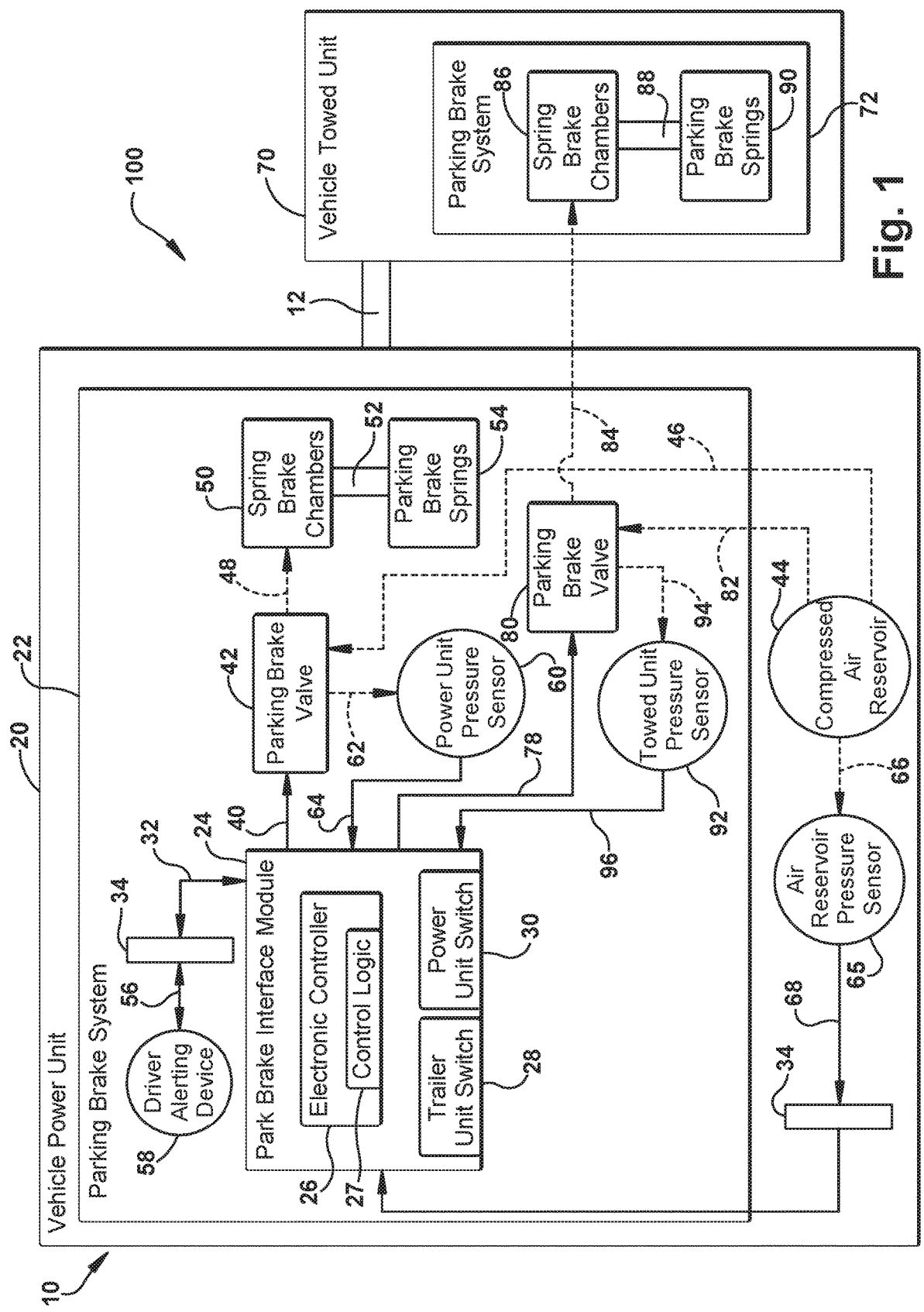
FIG. 1 is a schematic block diagram showing an example vehicle embodying a parking brake apparatus in accordance with the present disclosure.

Referring to FIG. 1, a schematic block diagram showing an example vehicle 10 embodying a parking brake apparatus 100 in accordance with the present disclosure is illustrated. In FIG. 1, electrical line connections are shown as solid lines, pneumatic lines connections are shown as dashed lines, and mechanical couplings are shown as double solid lines.

Vehicle 10 includes vehicle power unit 20 and vehicle towed unit 70 that is connectable via coupling 12 to the vehicle power unit 20. Vehicle power unit 20 may comprise a truck tractor, and vehicle towed unit 70 may comprise a truck trailer. Other types of vehicle power units and other types of vehicle towed units are possible.

Vehicle power unit 20 includes parking brake system 22 that operates to apply and release park brakes of the vehicle power unit 20. Parking brake system 22 includes a park brake interface module 24 located in the vehicle driver cab and accessible to the vehicle driver. The park brake interface module 24 has an electronic controller 26 with control logic 27, a trailer unit switch 28, and a power unit switch 30. The trailer unit switch 28 and the power unit switch 30 are driver-operable to apply and release park brakes of the vehicle power unit 20 and park brakes of the vehicle towed unit 70.

Electronic controller 26 may be a parking brake controller and is arranged to monitor output signals (e.g., from the trailer unit switch 28 and the power unit switch 30) which are indicative of the vehicle driver's intent to either apply or release park brakes of the vehicle power unit 20 and park brakes of the vehicle towed unit 70. The controller 26 provides one or more control signals based upon the control logic 27 that is stored in a data storage unit of the controller 26. The controller 26 provides signals on line 40 to control operation of a parking brake valve 42 of the parking brake system 22 of the vehicle power unit 20. Compressed air reservoir 44 of the vehicle power unit 20 provides a source of compressed air in line 46 to the parking brake valve 42. Parking brake valve 42 is controlled by controller 26 to vary pneumatic pressure in line 48 to one or more chambers of spring brake chambers 50 of the parking brake system 22 of the vehicle power unit 20.

More specifically, when the parking brakes of the vehicle power unit 20 are applied, the controller 26 provides signals on line 40 that are applied to parking brake valve 42 so as to exhaust air in one or more chambers of spring brake chambers 50. The spring brake chambers 50 are operatively coupled via line 52 in known manner to parking brake springs 54 of the parking brake system 22 of the vehicle power unit 20. When air in spring brake chambers 50 is exhausted and system air pressure drops to less than about 45 pound-force per square inch (psi) to 60 psi, parking brake springs 54 are activated to apply the park brakes of the vehicle power unit 20, as is known. Structure and operation of controller 26 and parking brake valve 42 for controlling operation of spring brake chambers 50 and parking brake springs 54 of the vehicle power unit 20 are conventional and, therefore, will not be further described.

Controller 26 also provides a signal on line 32 via a controller area network (CAN) bus 34 to line 56 to a driver alerting device 58. The driver alerting device 58 may comprise any type of visual alerting device. Other types of devices for alerting the vehicle driver are possible. For example, haptic or audio devices may be used to alert the vehicle driver.

A power unit pressure sensor 60 monitors air pressure in line 62 from the parking brake valve 42, and provides output signal indicative thereof on line 64 for monitoring by the controller 26. Alternatively, the output signal on line 64 may be connected via the CAN bus 34 to the controller 26 instead of directly to the controller 26. An air reservoir pressure sensor 65 monitors air pressure in line 66 from the compressed air reservoir 44, and provides an output signal indicative thereof on line 68 to the CAN bus 34 for monitoring by the controller 26. Alternatively, the output signal on line 68 may be connected directly to the controller 26 instead of via the CAN bus 34.

Vehicle towed unit 70 includes parking brake system 72 that operates to apply and release park brakes of the vehicle towed unit 70. More specifically, compressed air reservoir 44 of the vehicle power unit 20 provides a source of compressed air in line 82 to a parking brake valve 80 of the parking brake system 22 of the vehicle power unit 20. Parking brake valve 80 is controlled by controller 26 to vary pneumatic pressure in line 84 to one or more chambers of spring brake chambers 86 of the parking brake system 72 of the vehicle towed unit 70.

More specifically, when the park brakes of the vehicle towed unit 70 are applied, the controller 26 provides signals on line 78 that are applied to parking brake valve 80 so as to exhaust air in one or more chambers of spring brake chambers 86 of the parking brake system 72 of the vehicle towed unit 70. The spring brake chambers 86 are operatively coupled via line 88 in known manner to parking brake springs 90 of the parking brake system 72 of the vehicle towed unit 70. When air in spring brake chambers 86 is exhausted and system air pressure drops to less than about 45 psi to 60 psi, parking brake springs 90 are activated to apply the park brakes of the vehicle towed unit 70, as is known. Structure and operation of controller 26 and parking brake valve 80 for controlling operation of spring brake chambers 86 and parking brake springs 90 of the vehicle towed unit 70 are conventional and, therefore, will not be further described.

A towed unit pressure sensor 92 monitors air pressure in line 94 from the parking brake valve 80, and provides output signal indicative thereof on line 96 to the controller 26. Alternatively, the output signal on line 96 may be connected via the CAN bus 34 to the controller 26.

In accordance with an implementation of the present disclosure, the controller 26 provides status signal on line 56 indicative of whether or not the vehicle towed unit 70 is connected to the vehicle power unit 20 based upon the pressure signal on line 96 from the towed unit pressure sensor 92. The pressure signal on line 96 is indicative of delivery air pressure applied to air brake parking components (i.e., the parking brake valve 80 and the spring brake chambers 86) of the vehicle towed unit 70 when the vehicle towed unit 70 is connected to the vehicle power unit 20.

In some embodiments, the status signal on line 56 is indicative of the vehicle towed unit 70 not being connected to the vehicle power unit 20 when the pressure signal on line 96 is either below a predetermined threshold pressure or absent. The status signal on line 56 is provided to the driver alerting device 58 to alert the vehicle driver that no vehicle towed unit is connected to the vehicle power unit 20. The status signal can be processed by any combination of vehicle electronic controllers including the controller 26 to control application or release of one or more park brakes of the vehicle 10.

In some embodiments, the status signal on line 56 is indicative of the vehicle towed unit 70 being connected to the vehicle power unit 20 when the pressure signal on line 96 is above a predetermined threshold pressure for a predetermined amount of time. The status signal on line 56 is provided to the driver alerting device 58 to alert the vehicle driver that the vehicle towed unit 70 is connected to the vehicle power unit 20. The status signal can be processed by any combination of vehicle electronic controllers including the controller 26 to control application or release of one or more park brakes of the vehicle 10.

In accordance with another implementation of the present disclosure, the parking brake controller 34 provides status signal on line 56 indicative of whether or not the vehicle towed unit 70 is connected to the vehicle power unit 20 based upon first and second pressure signals. The first pressure signal is the pressure signal on line 64 from the power unit pressure sensor 60, and the second pressure signal is the pressure signal on line 96 from the towed unit pressure sensor 92. The first pressure signal on line 64 is indicative of delivery pressure applied to air brake components (i.e., the parking brake valve 42 and the spring brake chambers 50) of the vehicle power unit 20. The second pressure signal on line 96 is indicative of delivery air pressure applied to air brake parking components (i.e., the parking brake valve 80 and the spring brake chambers 86) of the vehicle towed unit 70 when the vehicle towed unit 70 is connected to the vehicle power unit 20.

In some embodiments, the status signal on line 56 is indicative of the vehicle towed unit 70 not being connected to the vehicle power unit 20 when the second pressure signal on line 96 is either below a predetermined threshold pressure or absent. The status signal on line 56 is provided to the driver alerting device 58 to alert the vehicle driver that no vehicle towed unit is connected to the vehicle power unit 20. The status signal can be processed by any combination of vehicle electronic controllers including the controller 26 to control application or release of one or more park brakes of the vehicle 10.

In some embodiments, the status signal on line 56 is indicative of the vehicle towed unit 70 being connected to the vehicle power unit 20 when the first pressure signal on line 64 is above a first predetermined threshold pressure for a first predetermined amount of time, and the second pressure signal on line 96 is above a second predetermined threshold pressure for a second predetermined amount of time.

In some embodiments, the status signal on line 56 is indicative of the vehicle towed unit 70 being connected to the vehicle power unit 20 when the second pressure signal on line 96 is above a predetermined threshold pressure for a predetermined amount of time, and the second pressure signal on line 96 is within a predetermined tolerance of the first pressure signal on line 64.

In some embodiments, the status signal on line 56 is indicative of the vehicle towed unit 70 being connected to the vehicle power unit 20 when the first pressure signal on line 64 is above a first predetermined threshold pressure for a first predetermined amount of time, the second pressure signal on line 96 is above a second predetermined threshold pressure for a second predetermined amount of time, and the second pressure signal on line 96 is within a predetermined tolerance of the first pressure signal on line 64.

In some embodiments, the parking brake controller 26 is arranged to monitor the pressure signal on line 68 (i.e., a third pressure signal) indicative of a highest monitored pressure associated with the compressed air reservoir 44 of the vehicle power unit 20.

In some embodiments, the status signal on line 56 is indicative of the vehicle towed unit 70 being connected to the vehicle power unit 20 when the first pressure signal on line 64 is above a first predetermined threshold pressure for a first predetermined amount of time, the second pressure signal on line 96 is above a second predetermined threshold pressure for a second predetermined amount of time, the second pressure signal on line 96 is within a predetermined tolerance of the first pressure signal on line 64, and at least one of the first and second pressure signals on lines 64, 96, respectively, is within another predetermined tolerance of the third pressure signal on line 68.

In some embodiments, the status signal on line 56 is indicative of the vehicle towed unit 70 being connected to the vehicle power unit 20 when the first pressure signal on line 64 is above a first predetermined threshold pressure for a first predetermined amount of time, the second pressure signal on line 96 is above a second predetermined threshold pressure for a second predetermined amount of time, the second pressure signal on line 96 is within a first predetermined tolerance of the first pressure signal on line 64, the first pressure signal on line 64 is within a second predetermined tolerance of the third pressure signal on line 68, and the second pressure signal on line 96 is within a third predetermined tolerance of the third pressure signal on line 68.

In accordance with yet another aspect of the present disclosure, at least a portion of the vehicle towed unit 70 is connectable to the vehicle power unit 20 and has air brake parking components including the towed unit pressure sensor 92. The towed unit pressure sensor 92 provides towed unit pressure signal on line 96 which is indicative of delivery air pressure applied to the air brake parking components (i.e., the parking brake valve 80 and the spring brake chambers 86) of the vehicle towed unit 70. The controller 26 of the vehicle power unit 20 monitors the towed unit pressure signal on line 96 and provides status signal on line 56 indicative of whether or not the vehicle towed unit 70 is connected to the vehicle power unit 20 based upon the towed unit pressure signal on line 96. The status signal can be processed by any combination of vehicle electronic controllers including the controller 26 to control application or release of one or more park brakes of the vehicle 10.

In some embodiments, the vehicle power unit 20 includes the power unit pressure sensor 60. The power unit pressure sensor 60 provides power pressure signal on line 64 which is indicative of delivery air pressure applied to the air brake parking components (i.e., the parking brake valve 42 and the spring brake chambers 50) of the vehicle power unit 20. The controller 26 of the vehicle power unit 20 monitors the power unit pressure signal on line 64, and provides the status signal on line 56 based upon the towed unit pressure signal on line 96 and the power unit pressure signal on line 64.

In some embodiments, the vehicle power unit 20 includes the air reservoir pressure sensor 65 that provides air reservoir pressure signal on line 68. The controller 26 of the vehicle power unit 20 monitors the air reservoir pressure signal on line 68, and provides the status signal on line 56 based upon the towed unit pressure signal on line 96, the power unit pressure signal on line 64, and the air reservoir pressure signal on line 68. The air reservoir pressure signal on line 68 may comprise the highest monitored pressure associated with the compressed air reservoir 44 of the vehicle power unit 20.

In some embodiments, the vehicle power unit 20 comprises (i) the park brake interface module 24 including the controller 26, and (ii) the parking brake valve 42 which is separate from the park brake interface module 24.

Figure 2:
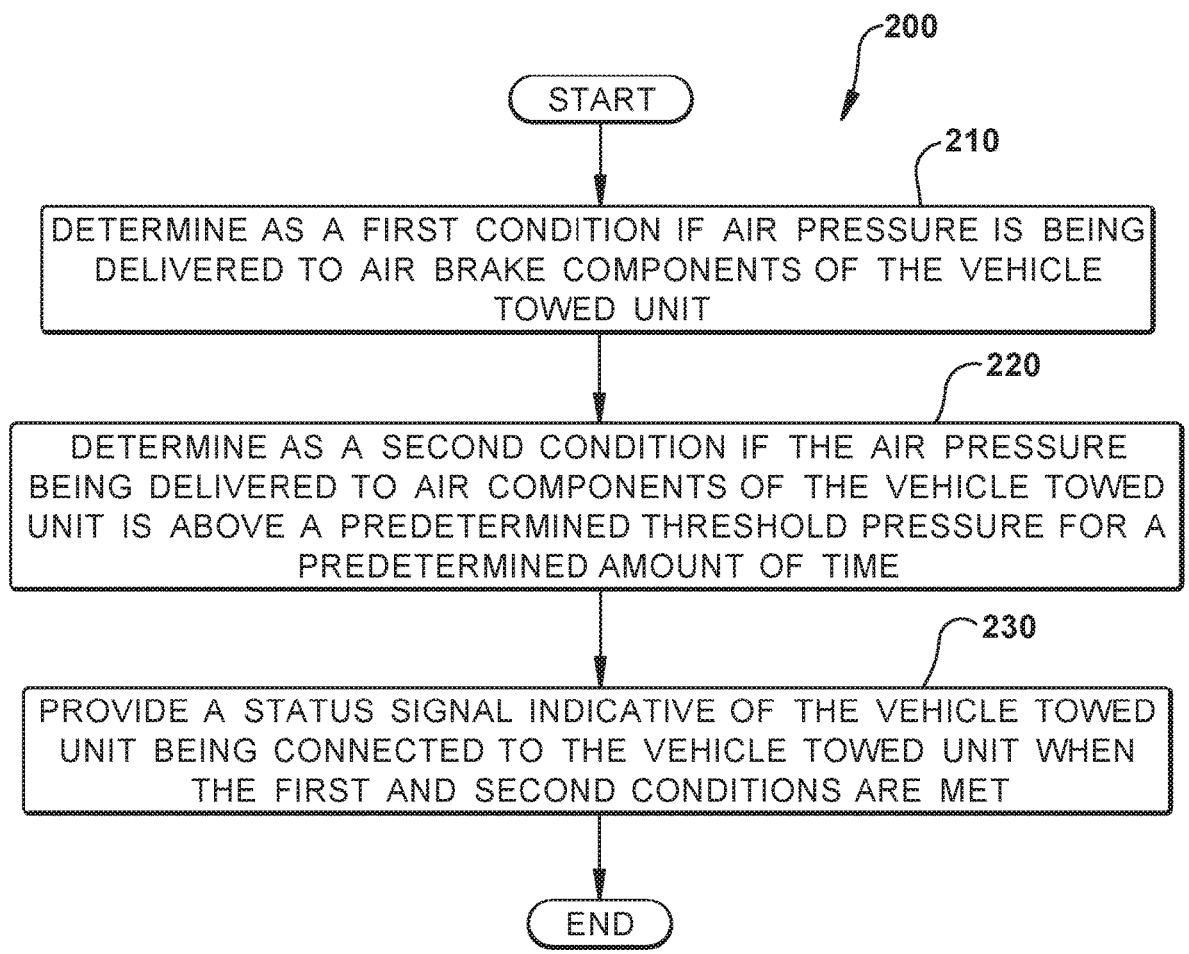
FIG. 2 is a flow diagram depicting an example method of operating the parking brake apparatus of FIG. 1 in accordance with an embodiment.

Referring to FIG. 2, a flow diagram 200 depicting an example method of operating the parking brake apparatus 100 in accordance with an embodiment is illustrated. The method is for a vehicle power unit having a compressed air reservoir and to which a vehicle towed unit can be connected. In block 210, a first condition is determined if air pressure is being delivered to air brake components of the vehicle towed unit. In block 220, a second condition is determined if the air pressure being delivered to air components of the vehicle towed unit is above a predetermined threshold pressure for a predetermined amount of time. Then in block 230, a status signal is provided indicative of the vehicle towed unit being connected to the vehicle towed unit when the first and second conditions are met. The process then ends.

In some embodiments, the status signal indicative of the vehicle towed unit being connected to the vehicle towed unit is provided only when the first and second conditions are met.

In some embodiments, the method further comprises controlling application or release of any combination of air brake parking components of the vehicle power unit and air brake parking components of the vehicle towed unit to park or unpark the vehicle power unit and the vehicle towed unit if connected to the vehicle power unit.

Figure 3A:
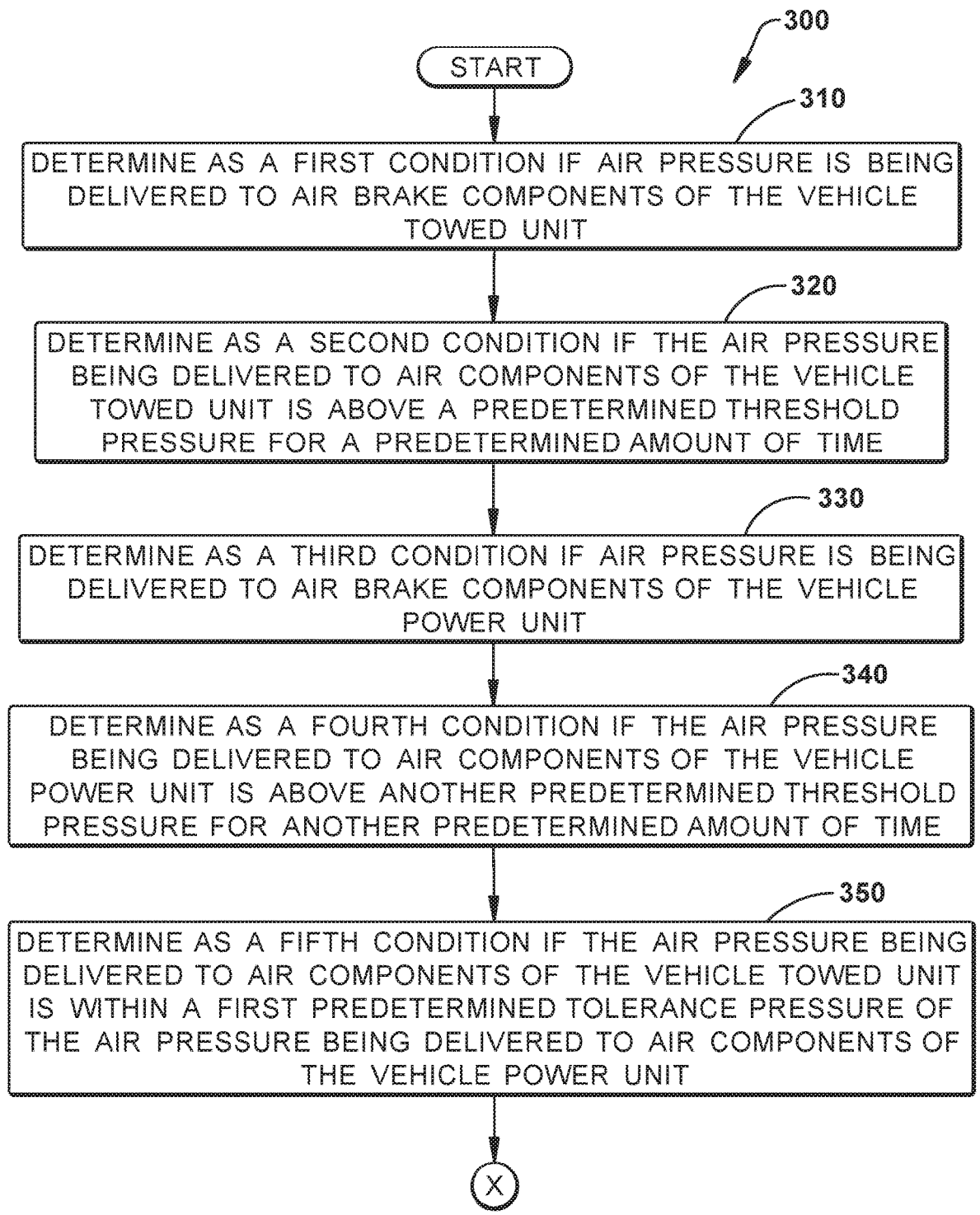
FIGS. 3A and 3B are a flow diagram depicting an example method of operating the parking brake apparatus of FIG. 1 in accordance with another embodiment.
Figure 3B:
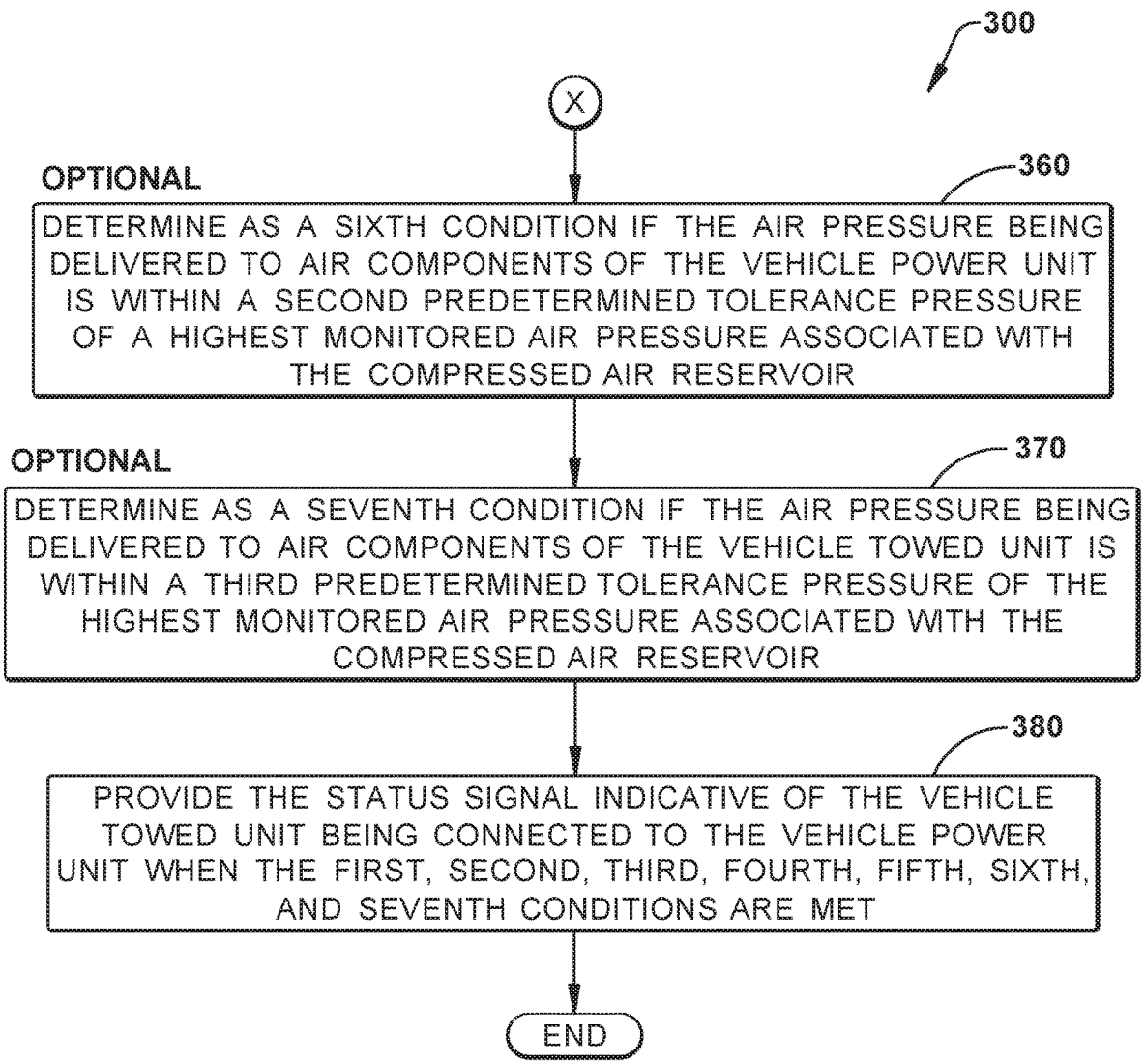

Referring to FIGS. 3A and 3B, a flow diagram 300 depicting an example method of operating the parking brake apparatus 100 of FIG. 1 in accordance with another embodiment is illustrated. The method is for a vehicle power unit having a compressed air reservoir and to which a vehicle towed unit can be connected. In block 310, a first condition is determined if air pressure is being delivered to air brake components of the vehicle towed unit. In block 320, a second condition is determined if the air pressure being delivered to air components of the vehicle towed unit is above a predetermined threshold pressure for a predetermined amount of time. The process proceeds to block 330.

In block 330, a third condition is determined if air pressure is being delivered to air brake components of the vehicle power unit. In block 340, a fourth condition is determined if the air pressure being delivered to air components of the vehicle power unit is above another predetermined threshold pressure for another predetermined amount of time. Then in block 350, a fifth condition is determined if the air pressure being delivered to air components of the vehicle towed unit is within a first predetermined tolerance pressure of the air pressure being delivered to air components of the vehicle power unit. The process then proceeds to optional blocks 360 and 370.

In optional block 360, a sixth condition is determined if the air pressure being delivered to air components of the vehicle power unit is within a second predetermined tolerance pressure of a highest monitored air pressure associated with the compressed air reservoir 44. In optional block 370, a seventh condition is determined if the air pressure being delivered to air components of the vehicle towed unit is within a third predetermined tolerance pressure of the highest monitored air pressure associated with the compressed air reservoir 44. Then in block 380, a status signal is provided indicative of the vehicle towed unit being connected to the vehicle power unit when the first, second, third, fourth, fifth, optional sixth, and optional seventh conditions are met. The process then ends.

In some embodiments, the method further comprises controlling application or release of any combination of air brake parking components of the vehicle power unit and air brake parking components of the vehicle towed unit to park or unpark the vehicle power unit and the vehicle towed unit if connected to the vehicle power unit.

Example predetermined values, each of which can be a configurable value, for the conditions disclosed in the above-described embodiments are substantially as follows:

The first predetermined threshold pressure associated with the first pressure signal on line 64 from the power unit pressure sensor 60 is about 60 psi;

The second predetermined threshold pressure associated with the second pressure signal on line 96 from the towed unit pressure sensor 92 is about 60 psi;

The first predetermined amount of time associated with the first pressure signal on line 64 from the power unit pressure sensor 60 is about one second;

The second predetermined amount of time associated with the second pressure signal on line 96 from the towed unit pressure sensor 92 is about one second;

The first predetermined tolerance associated with the pressure between the second pressure signal on line 96 and the first pressure signal on line 64 is about 10 psi;

The second predetermined tolerance associated with the pressure between the first pressure signal on line 64 and third pressure signal on line 68 is about 10 psi; and The third predetermined tolerance associated with the pressure between the second pressure signal on line 96 and the third pressure signal on line 68 is about 10 psi.

The above threshold pressure values, time values, and tolerance pressure values are only example values. Other threshold pressure values, time values, and tolerance pressure values are possible.

A number of advantages are provided by using the above-described parking brake apparatus 100 of FIG. 1, method 200 of FIG. 2, and method 300 of FIGS. 3A and 3B in a vehicle. One advantage is that only a pressure associated with the vehicle towed unit 70 is required to determine whether or not the vehicle towed unit is connected to the vehicle power unit 20.

Another advantage is that the parking brake apparatus 100 and methods 200, 300 can be embodied in a vehicle having any type of vehicle power unit, any type of vehicle towed unit, and any type of vehicle driver interface. As an example, the park brake interface module 24 may comprise Intellipark® Electronic Parking Brake system, commercially available from Bendix Commercial Vehicle Systems, LLC located in Elyria, Ohio. The Intellipark® Electronic Parking Brake system has a vehicle driver interface type, such as shown in FIG. 1, in which the park brake interface module 24 includes the controller 26, and the parking brake valve 42 is separate from the park brake interface module 24.

Alternatively, it is conceivable that the parking brake valve 42 includes the controller 26, and the park brake interface module 24 is separate from the parking brake valve 42. It is also conceivable that the park brake interface module 24 includes both the controller 26 and the parking brake valve 42 to comprise a single integrated unit. Moreover, it is conceivable that the controller 26 is separate from the park brake interface module 24 and is also separate from the parking brake valve 42. Other locations of the controller 26 are possible.

Program instructions for enabling the controller 26 shown in FIG. 1 to perform operation steps in accordance with flow diagram 200 shown in FIG. 2, or flow diagram 300 shown in FIGS. 3A and 3B, may be embedded in memory internal to controller 26. Alternatively, or in addition to, program instructions may be stored in memory external to controller 26. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one electronic controller unit (i.e., the controller 26 with control logic 27), it is conceivable that any number of electronic controller units may be used. Moreover, it is conceivable that any type of electronic controller unit may be used. Suitable electronic controller units for use in vehicles are known and, therefore, have not been described. Accordingly, the program instructions of control logic 27 of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake apparatus for a vehicle power unit having air brake parking components and capable of being connected to a vehicle towed unit having air brake parking components, the parking brake apparatus comprising:
    an electronic controller associated with the vehicle power unit and arranged to (i) monitor a pressure signal indicative of a delivery air pressure applied to air brake parking components of a vehicle towed unit when the vehicle towed unit is connected to the vehicle power unit, (ii) provide a status signal indicative of whether or not the vehicle towed unit is connected to the vehicle power unit based upon the pressure signal, and (iii) enable the status signal to be processed to control application or release of any combination of air brake parking components of the vehicle power unit and air brake parking components of the vehicle towed unit to park or unpark the vehicle power unit and the vehicle towed unit when connected to the vehicle power unit;
    wherein the status signal is indicative of the vehicle towed unit being connected to the vehicle power unit when the pressure signal indicative of the delivery air pressure applied to the air brake parking components of the vehicle towed unit is above a predetermined threshold pressure for a predetermined amount of time, and the second pressure signal is within a predetermined tolerance of a pressure signal indicative of a delivery air pressure applied to the air brake parking components of the vehicle power unit.

2. A parking brake apparatus according to claim 1, wherein the status signal is indicative of the vehicle towed unit not being connected to the vehicle power unit when the pressure signal is either below a predetermined threshold pressure or absent.

3. A parking brake apparatus according to claim 1, wherein the status signal is indicative of the vehicle towed unit being connected to the vehicle power unit when the pressure signal is above a predetermined threshold pressure for a predetermined amount of time.

4. A parking brake apparatus for a vehicle power unit having air brake parking components and capable of being connected to a vehicle towed unit having air brake parking components, the parking brake apparatus comprising:
    an electronic controller associated with the vehicle power unit and arranged to (i) monitor a first pressure signal indicative of a delivery pressure applied to air brake components of the vehicle power unit, (ii) monitor a second pressure signal indicative of a delivery air pressure applied to air brake parking components of a vehicle towed unit when the vehicle towed unit is connected to the vehicle power unit, (iii) provide a status signal indicative of whether or not the vehicle towed unit is connected to the vehicle power unit based upon the first and second pressure signals, and (iv) enable the status signal to be processed to control application or release of any combination of air brake parking components of the vehicle power unit and air brake parking components of the vehicle towed unit to park or unpark the vehicle power unit and the vehicle towed unit if connected to the vehicle power unit;
    wherein the status signal is indicative of the vehicle towed unit being connected to the vehicle power unit when the first pressure signal is above a first predetermined threshold pressure for a first predetermined amount of time, and the second pressure signal is above a second predetermined threshold pressure for a second predetermined amount of time.

5. A parking brake apparatus according to claim 4, wherein the status signal is indicative of the vehicle towed unit not being connected to the vehicle power unit when the second pressure signal is either below a predetermined threshold pressure or absent.

6. A parking brake apparatus, for a vehicle power unit having air brake parking components and capable of being connected to a vehicle towed unit having air brake parking components, the parking brake apparatus comprising:
    an electronic controller associated with the vehicle power unit and arranged to (i) monitor a first pressure signal indicative of a delivery pressure applied to air brake components of the vehicle power unit, (ii) monitor a second pressure signal indicative of a delivery air pressure applied to air brake parking components of a vehicle towed unit when the vehicle towed unit is connected to the vehicle power unit, (iii) provide a status signal indicative of whether or not the vehicle towed unit is connected to the vehicle power unit based upon the first and second pressure signals, and (iv) enable the status signal to be processed to control application or release of any combination of air brake parking components of the vehicle power unit and air brake parking components of the vehicle towed unit to park or unpark the vehicle power unit and the vehicle towed unit if connected to the vehicle power unit;

wherein the status signal is indicative of the vehicle towed unit being connected to the vehicle power unit when the first pressure signal is above a first predetermined threshold pressure for a first predetermined amount of time, the second pressure signal is above a second predetermined threshold pressure for a second predetermined amount of time, and the second pressure signal is within a predetermined tolerance of the first pressure signal.

7. A parking brake apparatus, for a vehicle power unit having air brake parking components and capable of being connected to a vehicle towed unit having air brake parking components, the parking brake apparatus comprising:

an electronic controller associated with the vehicle power unit and arranged to (i) monitor a first pressure signal indicative of a delivery pressure applied to air brake components of the vehicle power unit, (ii) monitor a second pressure signal indicative of a delivery air pressure applied to air brake parking components of a vehicle towed unit when the vehicle towed unit is connected to the vehicle power unit, (iii) provide a status signal indicative of whether or not the vehicle towed unit is connected to the vehicle power unit based upon the first and second pressure signals, and (iv) enable the status signal to be processed to control application or release of any combination of air brake parking components of the vehicle power unit and air brake parking components of the vehicle towed unit to park or unpark the vehicle power unit and the vehicle towed unit if connected to the vehicle power unit; wherein the electronic controller is arranged to monitor a third pressure signal indicative of a highest pressure associated with a compressed air reservoir of the vehicle power unit.

8. A parking brake apparatus according to claim 7, wherein the status signal is indicative of the vehicle towed unit being connected to the vehicle power unit when the first pressure signal is above a first predetermined threshold pressure for a first predetermined amount of time, the second pressure signal is above a second predetermined threshold pressure for a second predetermined amount of time, the second pressure signal is within a predetermined tolerance of the first pressure signal, and at least one of the first and second pressure signals is within another predetermined tolerance of the third pressure signal.

9. A parking brake apparatus according to claim 8, wherein the status signal is indicative of the vehicle towed unit being connected to the vehicle power unit when the first pressure signal is above a first predetermined threshold pressure for a first predetermined amount of time, the second pressure signal is above a second predetermined threshold pressure for a second predetermined amount of time, the second pressure signal is within a first predetermined tolerance of the first pressure signal, the first pressure signal is within a second predetermined tolerance of the third pressure signal, and the second pressure signal is within a third predetermined tolerance of the third pressure signal.

10. A parking brake apparatus comprising:
at least a portion of a vehicle power unit having air brake parking components including a parking brake controller; and
at least a portion of a vehicle towed unit connectable to the vehicle power unit and having air brake parking components including a towed unit pressure sensor arranged to provide a towed unit pressure signal indicative of a delivery air pressure applied to the air brake parking components of the vehicle towed unit;

wherein the parking brake controller of the vehicle power unit is arranged to monitor the towed unit pressure signal, provide a status signal indicative of whether or not the vehicle towed unit is connected to the vehicle power unit based upon the towed unit pressure signal, and enable the status signal to be processed to control application or release of any combination of air brake parking components of the vehicle power unit and air brake parking components of the vehicle towed unit to park or unpark the vehicle power unit and the vehicle towed unit when connected to the vehicle power unit; wherein (i) the vehicle power unit includes a power unit pressure sensor arranged to provide a power unit pressure signal indicative of delivery air pressure applied to the air brake parking components of the vehicle power unit, and (ii) the parking brake controller is arranged to monitor the power unit pressure signal, and provide the status signal based upon the towed unit pressure signal and the power unit pressure signal.

11. A parking brake apparatus according to claim 10, wherein (i) the vehicle power unit includes an air reservoir pressure sensor arranged to provide an air reservoir pressure indicative of pressure associated with a compressed air reservoir of the vehicle power unit, and (ii) the parking brake controller is arranged to monitor the air reservoir pressure signal and to provide the status signal based upon the towed unit pressure signal, the power unit pressure signal, and the air reservoir pressure signal.

12. A parking brake apparatus according to claim 10, wherein the vehicle power unit comprises (i) a park brake interface module including the parking brake controller, and (ii) a parking brake valve which is separate from the park brake interface module.

13. A method for a vehicle power unit having a compressed air reservoir and capable of being connected to a vehicle towed unit, the method comprising:
determining as a first condition when air pressure is being delivered to air brake components of the vehicle towed unit;
determining as a second condition when the air pressure being delivered to air components of the vehicle towed unit is above a predetermined threshold pressure for a predetermined amount of time; and
providing a status signal indicative of the vehicle towed unit being connected to the vehicle towed unit when the first and second conditions are met
determining as a third condition when air pressure is being delivered to air brake components of the vehicle power unit;
determining as a fourth condition when the air pressure being delivered to air components of the vehicle power unit is above another predetermined threshold pressure for another predetermined amount of time;
determining as a fifth condition when the air pressure being delivered to air components of the vehicle towed unit is within a first predetermined tolerance pressure of the air pressure being delivered to air components of the vehicle power unit; and
providing the status signal indicative of the vehicle towed unit being connected to the vehicle towed unit when the first, second, third, fourth, and fifth conditions are met.

14. A method according to claim 13, further comprising:
determining as a sixth condition if the air pressure being delivered to air components of the vehicle power unit is within a second predetermined tolerance pressure of a highest monitored air pressure associated with the compressed air reservoir;

determining as a seventh condition if the air pressure being delivered to air components of the vehicle towed unit is within a third predetermined tolerance pressure of the highest air pressure associated with the compressed air reservoir; and providing the status signal indicative of the vehicle towed unit being connected to the vehicle towed unit when the first, second, third, fourth, fifth, sixth, and seventh conditions are met.

15. A method according to claim 14, further comprising:
controlling application or release of any combination of air brake parking components of the vehicle power unit and air brake parking components of the vehicle towed unit to park or unpark the vehicle power unit and the vehicle towed unit if connected to the vehicle power unit.

16. A method according to claim 13, wherein providing a status signal indicative of the vehicle towed unit being connected to the vehicle towed unit when the first and second conditions are met includes:

providing the status signal indicative of the vehicle towed unit being connected to the vehicle towed unit only when the first and second conditions are met.

17. A method according to claim 13, further comprising:
controlling application or release of any combination of air brake parking components of the vehicle power unit and air brake parking components of the vehicle towed unit to park or unpark the vehicle power unit and the vehicle towed unit if connected to the vehicle power unit.

18. A method according to claim 13, wherein the method is performed by a computer having a memory executing one or more programs of instructions which are tangibly embodied in a program storage medium readable by the computer.

* * * * *